United States Patent [19]

Arhart

[11] 3,962,372

[45] June 8, 1976

[54] STABILIZED QUICK SET ADHESIVES

[75] Inventor: Richard James Arhart, Wilmington, Del.

[73] Assignee: E. I. Du Pont de Nemours and Company, Wilmington, Del.

[22] Filed: Jan. 14, 1975

[21] Appl. No.: 540,846

[52] U.S. Cl. .............................. 260/878 R; 526/20; 526/41; 526/42; 526/232; 526/303; 526/317; 526/328; 526/342; 260/45.95 R
[51] Int. Cl.$^2$ .................. C08L 23/34; C08F 255/02
[58] Field of Search ................... 260/878 R, 94.9 H

[56] References Cited
UNITED STATES PATENTS

| | | | |
|---|---|---|---|
| 3,218,305 | 11/1965 | Krieble | 260/89.5 |
| 3,322,857 | 5/1967 | Coaker et al. | 260/878 R |
| 3,594,451 | 7/1971 | Keown | 260/878 R |
| 3,751,378 | 8/1973 | Cowperthwaite et al. | 260/878 R |
| 3,890,407 | 6/1975 | Briggs, Jr. et al. | 260/878 R |

*Primary Examiner*—Alan Holler

[57] ABSTRACT

Adhesive compositions of acrylic or methacrylic monomers, chlorosulfonated polyethylene, and polymerization initiator of increased shelf stability but fast set up time, containing 2,6-di-t-butyl-4-methylphenol.

10 Claims, No Drawings

STABILIZED QUICK SET ADHESIVES

This invention relates to adhesive compositions containing acrylic and/or methacrylic monomers, chlorosulfonated polyethylene, and a polymerization catalyst (initiator). Such compositions are described in U.S. Pat. application Ser. No. 357,387, filed May 4, 1973, now U.S. Pat. No. 3,890,407. The aforesaid U.S. application has been published in Germany as Offenlegungsschrift No. 2,337,049 on Feb. 14, 1974. Some of the compositions disclosed in this aforesaid application are relatively unstable, that is, the compositions tend to set up prematurely while still in the adhesive container. This instability is described in the art as short pot life. Short pot life is a significant problem in compositions containing as polymerization catalysts organic peroxides and hydroperoxides. Such compositions have the desirable property of forming rapid bonds of high strength.

It is commercially desirable that an adhesive have a pot life such that its viscosity will be less than 150,000 centipoise when the adhesive is maintained at 72°F. for 6 months, and that the adhesive after aging at 72°F. for 6 months also have a bond strength on metal of greater than 100 pounds per square inch within 4 minutes. An accelerated test for measuring the viscosity change and bond strength deterioration is to heat the adhesive to 122°F. for 7 days. If the adhesive after aging at 122°F. for 7 days has viscosity of less than 150,000 centipoise and has a bond strength of greater than 300 pounds per square inch within 3 minutes, it will meet the commercially desirable standard.

In order to try to increase the pot life of these adhesive compositions various known stabilizers were employed, and in several instances on increase in the pot life was obtained; however, when the compositions containing the stabilizers were used as adhesives, a substantial increase in the length of time for the adhesive to set up was observed. The only exception to this pattern was obtained when 2,6-di-t-butyl-4-methylphenol was employed as the stabilizer in certain ratios with the polymerization catalyst. The compositions containing 2,6-di-t-butyl-4-methylphenol have a greatly improved pot life, and the property of rapid set-up when employed as an adhesive.

This invention is concerned with compositions which have a Brookfield viscosity of between about 2000 centipoise and about 150,000 centipoise as measured by ASTM V 490.0500 using a number 4 spindle at 12 and 6 rpm. The compositions contain a chlorosulfonated polyethylene which has a chlorine content of about 25 to 70 percent by weight of the polymer. The chlorosulfonated polyethylene has about 3 to 160 millimoles of sulfonyl chloride moiety per 100 grams of polymer. The chlorosulfonated polyethylene has a high molecular weight — suitable chlorosulfonated polyethylene can be made by commercial processes from polyethylene having a melt index of about 0.1 to 500 g/10 min. The compositions contain at least one monomer selected from the class consisting of acrylic and methacrylic monomers. Suitable monomers are methacrylic acid, acrylic acid, methyl methacrylate, ethyl methacrylate, acrylonitrile, methacrylonitrile, methyl acrylate, ethyl acrylate, butyl methacrylate, cyclohexyl methacrylate, 2-ethylhexyl methacrylate, glycidyl methacrylate, ethylene glycol dimethacrylate and acrylamide. Mixtures of these monomers may be employed. The composition also contains a polymerization catalyst (initiator). Suitable catalysts are organic peroxides and organic hydroperoxides, preferably selected from the class consisting of cumene hydroperoxide, benzoyl peroxide, t-butyl perbenzoate, lauroyl peroxide, di-ti-butyl diperphthalate, t-butyl peracetate, t-butyl hydroperoxide, p-menthane hydroperoxide. Mixtures of these catalysts are also useful. The amount of catalyst employed will normally be within the range of about 0.01 to 10 parts by weight of the entire composition, and usually within the range of about 0.1 to 5 parts by weight of the entire composition. Finally, the composition of this invention must contain the stabilizer 2,6-di-t-butyl-4-methylphenol. The amount of this stabilizer present should be within the range of about 0.01 to 10 parts by weight of the entire composition, and should be present in an amount such that the weight ratio of polymerization initiator to stabilizer is within the range of about 1 to 1 to about 4 to 1. Preferably, the weight ratio of polymerization catalyst to stabilizer is about 2 to 1.

As described in the aforementioned U.S. application Ser. No. 357,387, these adhesive compositions are usually employed in combination with an accelerator which is applied to the substrates to be adhered together prior to the application of the adhesive composition. Suitable accelerators are available commercially. DuPont Accelerator 808, a condensation product of butyraldehyde and aniline and Du Pont Accelerator 833, a condensation product of butyraldehyde and n-butyl amine, are two of the preferred accelerators.

In the following Examples which illustrate the invention all parts and percentages are in parts by weight unless otherwise specified.

EXAMPLES

In the following examples lap shear specimens were prepared by applying to 1 × 3 × 0.062 inch grit-blasted and perchloroethylene-solvent-degreased steel strips a thin film of either Du Pont Accelerator 808 (condensation product of butyraldehyde and aniline) or 833 (condensation product of butyraldehyde and n-butyl amine). A small amount of the adhesive composition was then applied and the steel coupons were clipped together directly in an Instron machine so that a glue-line of 0.002–0.005 × 1 × 1 inch was obtained. The specimens were tested in shear at room temperature, usually after two or three minutes with a separation rate of 0.5 inches/min. (ASTM method D-1876-61T). Lap shear strengths were recorded as the average of a minimum of three specimens.

The adhesives were prepared by dissolving the chlorosulfonated polyethylene in the acrylic monomers by rolling in a jar at room temperature until the polymer was dissolved (usually 24–72 hours). Other ingredients were added to the polymer-in-monomer solution and the composition mixed by stirring.

All adhesive compositions were aged in tightly capped jars at the indicated temperature. At time intervals, the Brookfield viscosities were recorded and the relative cure rates were determined with an Instron machine. Brookfield viscosities were determined by ASTM method V 490.0500 using the indicated spindle and rpm.

Control Experiment 1

This example demonstrates that various types of antioxidants do not meet the viscosity stability and lap shear strength criteria.

Monomer-in-Polymer Solution A
  40% Chlorosulfonated polyethylene[1]
  49% Methyl methacrylate
  10% Methacrylic acid
  1% Ethylene dimethacrylate 1) Chlorosulfonated polyethylene containing 43% chlorine and 1.1% sulfur, Mooney viscosity 30. Prepared from a low-density, branched-chain polyethylene of melt index of about 10.

| Sample | A | B | C | D |
|---|---|---|---|---|
| Soln. A | 100 | 100 | 100 | 100 |
| Cumene Hydroperoxide | 0.5 | 0.5 | 0.5 | 0.5 |
| Fortified Hindered Phenol[1] | — | 0.15 | — | — |
| Aldol-α-Naphthylamine[2] | — | — | 0.15 | — |
| Tri(Mixed Mono- and Di-nonylphenyl)Phosphite[3] | — | — | — | 0.15 |
| Aging Temperature: 72°F. | | | | |
| Brookfield Viscosity, cps × 10$^{-3}$ | | | | |
| (Spindle No. 4, 1.5 rpm) | | | | |
| Aged, 0 months | 14.5[4] | ~16.0[4] | ~15.5[4] | ~13.0[4] |
| 0.5 | 36.0 | 18.0[5] | 35.0[5] | 16.7[4] |
| 1 | 780.0[6] | 21.0[6] | 60.0 | 21.4[5] |
| 3 | Gelled | 27.2 | 136.0 | 44.8 |
| 6 | — | Gelled | 296 | Gelled |
| 2-Min. Lap Shear Strength, psi | | | | |
| Aged, 0 months | 460 | 820 | 710 | 840 |
| 0.5 | ← Not Tested → | | | |
| 1 | 90 | 420 | 525 | 715 |
| 3 | — | 490.0[7] | 295.0[7] | 920.0[7] |
| 6 | — | — | 180.0[8] | — |

[1] Sold by Du Pont as "Zalba Special".
[2] Condensation product of α-naphthylamine and 3-hydroxy-butyraldehyde, sold by Vanderbilt Chemical Co. as "Age Rite" Resin.
[3] Sold by Uniroyal as "Polygard".
[4] Brookfield at 6 rpm
[5] Brookfield at 3 rpm
[6] Brookfield at 0.3 rpm
[7] 3.5-min lap shear strength
[8] 4.0-min. lap shear strength

EXAMPLE 1

This example demonstrates that adhesives containing 2,6-di-t-butyl-4-methylphenol meet the viscosity stability and lap shear strength requirements, and that several other antioxidants do not.

Monomer-in-Polymer Soln. B:
  35% Chlorosulfonated polyethylene[1]
  54% Methyl methacrylate
  10% Methacrylic acid
  1% Ethylene dimethacrylate

| Sample | A | B | C | D |
|---|---|---|---|---|
| Soln. B | 100 | 100 | 100 | 100 |
| Cumene Hydroperoxide | 0.5 | 0.5 | 0.5 | 0.5 |
| 2,6-Di-t-butyl-4-methylphenol, | — | 0.15 | — | — |
| Benzoquinone | — | — | 0.15 | — |
| Phenyl-α-naphthylamine[2] | — | — | — | 0.15 |
| Aging Temperature: 72°F. | | | | |
| Brookfield Viscosity, cps × 10$^{-3}$ | | | | |
| (Spindle No. 4, 3 rpm) | | | | |
| Aged, 0 months | 27.6 | ~27.6 | ~27.6 | ~27.6 |
| 0.5 | 48.4 | 33.6 | 33.8 | 30.4 |
| 1 | 520.0[3] | 36.8 | 40.4 | 30.0 |
| 3 | Gelled | 67.0 | 77.4 | 56.6 |
| 6 | — | 90.4 | 145. | 84.0 |
| 3-Min. Lap Shear Strength, psi | A | B | C | D |
| Aged, 0 months | 540 | 590 | 526 | 890 |
| 0.5 | ← Not Tested → | | | |
| 1 | 1020 | 900 | 440 | 1070 |
| 3 | Gelled | 260 | 140 | 55 |
| 6 | — | 140.0[4] | 65.0[4] | Not Tested |

[1] Chlorosulfonated polyethylene containing 29% chlorine and 1.4% sulfur, Mooney viscosity 30. Prepared from a low-density, branched-chain polyethylene of melt index about 10.
[2] Sold by Du Pont as "Neozone" A.
[3] Brookfield at 0.3 rpm
[4] 4-Min. lap shear strength

| Sample | E | F | G |
|---|---|---|---|
| Soln. B | 100 | 100 | 100 |
| Cumene Hydroperoxide | 0.5 | 0.5 | 0.5 |

| Sample | E | F | G |
|---|---|---|---|
| 2,6-Di-t-butyl-4-methylphenol | 0.15 | — | — |
| Phenyl-α-naphthylamine[1] | — | 0.15 | — |
| 4,4'-Methylene-bis(2,6-di-t-butylphenol)[2] | — | — | 0.25 |
| Aging Temperature: 122°F. | | | |
| Brookfield Viscosity, cps × 10$^{-3}$ | | | |
| (Spindle No. 4, 3 rpm) | | | |
| Aged, 0 days | ~23.0 | ~23.0 | ~23.0 |
| 7 | 52.0 | Gelled <1 day | Estimate >1,000 |
| 3-Min. Lap Shear Strength, psi | | | |
| Aged, 7 days | 1280 | — | — |

[1] Sold by Du Pont as "Neozone" A.
[2] Sold by Ethyl Corporation as "Ethyl Antioxidant" 702.

CONTROL EXPERIMENT 2

This experiment illustrates that the presence of some antioxidants increases the gelation of the adhesive compared to the absence of any antioxidant.

| Sample | A | B |
|---|---|---|
| Soln. B[1] | 100 | 100 |
| Cumene Hydroperoxide | 0.25 | 0.25 |
| 2,6-Di-t-butyl-α-dimethylamino-p-cresol[2] | — | 0.10 |
| Aging Temperature: 72°F. | | |
| Brookfield Viscosity, cps × 10$^{-3}$ | | |
| (Spindle No. 4, 3 rpm) | | |
| Aged, 0 month | 24.0 | ~21.4 |
| 1 | 67.0 | Gelled |

[1] See Example 1.
[2] Sold as "Ethyl Antioxidant" 703 by Ethyl Corporation.

EXAMPLE 2

This example demonstrates that the preferred ratio of cumene hydroperoxide to 2,6-di-t-butyl-4-methylphenol is about 2:1.

| Sample | A | B | C | D | E | F |
|---|---|---|---|---|---|---|
| Soln. B | 100 | 100 | 100 | 100 | 100 | 100 |
| Cumene Hydroperoxide(X) | — | 0.5 | 0.5 | 0.5 | 0.5 | 0.5 |
| 2,6-Di-t-butyl-4-methylphenol(Y) | — | 0.05 | .10 | .15 | .20 | .25 |
| X:Y Ratio | — | 10 | 5 | 3.3 | 2.5 | 2 |
| Aging Temperature: 122°F. | | | | | | |
| Brookfield Viscosity, cps × 10$^{-3}$ | | | | | | |
| (Spindle No. 4, 1.5 rpm) | | | | | | |
| Aged, 7 days | 28.8 | Estimate >1,000 | Estimate >1,000 | 122 | 72.8 | 84.8 |
| 2-Min. Lap Shear Strength, psi | | | | | | |
| Aged, 7 days | 460.0[1] | — | — | 390 | 825 | 600 |

[1] added 0.5 parts cumene hydroperoxide

| Sample | G | H | I |
|---|---|---|---|
| Soln. B | 100 | 100 | 100 |
| Cumene Hydroperoxide(X) | — | 0.5 | 0.5 |
| 2,6-Di-t-butyl-4-methylphenol(Y) | — | .15 | .5 |
| X:Y Ratio | — | 3.3 | 1.0 |
| Aging Temperature: 122°F. | | | |
| Brookfield Viscosity, cps × 10$^{-3}$ | | | |
| (Spindle No. 4, 3 rpm) | | | |
| Aged, 7 days | 26.8 | 52.0 | 22.0 |
| 3-Min. Lap Shear Strength, psi | | | |
| Aged, 7 days | 1320.0[1] | 1280 | 35 |

[1] Added 0.5 phr cumene hydroperoxide.

In addition to the stabilizers shown in the control experiments as being ineffective to satisfactorily stabilize the adhesive compositions, the following compounds also failed to perform satisfactorily:
4-hydroxymethyl-2,6-di-t-butylphenol;
2,6-di-t-butylphenol;
2,2'-methylene-bis-(4-ethyl-6-t-butylphenol)
1,3,5-trimethyl-2,4,6-tris-(3,5,di-t-butyl-4 hydroxybenzyl) benzene; and
tetrachlorobenzoquinone.

I claim:
1. A composition comprising a solution having a Brookfield viscosity of between about 2000 centipoise and about 150,000 centipoise of a chlorosulfonated polyethylene in at least one monomer selected from the class consisting of acrylic or methacrylic monomers, and 0.01 to 10 parts by weight of the composition of a polymerization catalyst selected from the class consisting of organic peroxides and organic hydroperoxides, and 0.01 to 10 parts by weight of the composition of 2,6-di-t-butyl-4-methylphenol, the weight ratio of said polymerization catalyst to said 2,6-di-t-butyl-4-methylphenol being within the range of about 1 to 1 to 4 to 1, said chlorosulfonated polyethylene containing about

25 to 70 weight percent chlorine, and about 3 to 160 millimoles of sulfonyl chloride moiety per 100 g. of polymer, and being made from polyethylene having a melt index in the range of about 0.1 to 500 g/10 minutes.

2. The composition of claim 1 in which the at least one monomer is selected from the class consisting of methyl methacrylate, ethyl methacrylate, acrylonitrile, methacrylonitrile, methyl acrylate, ethyl acrylate, butyl methacrylate, cyclohexyl methacrylate, 2-ethylhexyl methacrylate, methacrylic acid, acrylic acid, glycidyl methacrylate, ethylene glycol dimethacrylate and acrylamide.

3. The composition of claim 2 in which the polymerization catalyst is present in the amount of 0.1 to 5 parts by weight of the composition.

4. The composition of claim 3 in which the polymerization catalyst is an organic hydroperoxide.

5. The composition of claim 4 in which the hydroperoxide is cumene hydroperoxide.

6. The composition of claim 5 containing methyl methacrylate.

7. The composition of claim 6 in which the mixture also contains methacrylic acid and ethylene glycol dimethacrylate.

8. The composition of claim 1 in which the ratio of polymerization catalyst to 2,6-di-t-butyl-4-methylphenol is about 2 to 1.

9. The composition of claim 8 in which the polymerization catalyst is present in the amount of about 0.1 to 5 parts by weight of the composition.

10. The composition of claim 9 in which the polymerization catalyst is cumene hydroperoxide.

* * * * *